US008552177B2

(12) United States Patent
Moya et al.

(10) Patent No.: US 8,552,177 B2
(45) Date of Patent: *Oct. 8, 2013

(54) ROOM TEMPERATURE STABLE AGAROSE SOLUTIONS

(75) Inventors: Wilson Moya, Concord, MA (US); Neil P. Soice, Amherst, NH (US)

(73) Assignee: EMD Millipore Corporation, Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/221,439

(22) Filed: Aug. 30, 2011

(65) Prior Publication Data

US 2011/0311762 A1 Dec. 22, 2011

Related U.S. Application Data

(62) Division of application No. 12/661,979, filed on Mar. 26, 2010, now Pat. No. 8,008,476, which is a division of application No. 11/050,243, filed on Feb. 3, 2005, now Pat. No. 7,687,619.

(60) Provisional application No. 60/542,026, filed on Feb. 5, 2004.

(51) Int. Cl.
| C08B 37/02 | (2006.01) |
|---|---|
| C08B 37/00 | (2006.01) |
| C07H 1/00 | (2006.01) |
| C07H 3/00 | (2006.01) |

(52) U.S. Cl.
USPC .......... 536/51; 536/112; 536/123.12; 536/124

(58) Field of Classification Search
None
See application file for complete search history.

(56) References Cited

U.S. PATENT DOCUMENTS

| | | | |
|---|---|---|---|
| 3,527,712 A | 9/1970 | Renn et al. | |
| 4,274,985 A | 6/1981 | Szejtli et al. | |
| 4,278,790 A * | 7/1981 | McCormick | 536/84 |
| 4,335,017 A | 6/1982 | Miles et al. | |
| 4,452,892 A | 6/1984 | Rosevear | |
| 4,606,824 A | 8/1986 | Chu | |
| 4,675,104 A | 6/1987 | Rai et al. | |
| 4,743,373 A | 5/1988 | Rai et al. | |
| 4,895,661 A | 1/1990 | Cadotte | |
| 4,895,806 A | 1/1990 | Le et al. | |
| 4,973,683 A * | 11/1990 | Lindgren | 536/120 |
| 4,986,909 A | 1/1991 | Rai et al. | |
| 5,009,759 A | 4/1991 | Serwer et al. | |
| 5,075,432 A | 12/1991 | Vanzo | |
| 5,277,915 A | 1/1994 | Provonchee et al. | |
| 5,328,603 A | 7/1994 | Velander et al. | |
| 5,338,448 A | 8/1994 | Gjerde | |
| 5,354,472 A | 10/1994 | Voorhees et al. | |
| 5,486,847 A | 1/1996 | Ranf et al. | |
| 5,492,723 A | 2/1996 | Sanderson et al. | |
| 5,520,916 A | 5/1996 | Dorigatti et al. | |
| 5,595,649 A | 1/1997 | Markell et al. | |
| 5,672,416 A | 9/1997 | Radola et al. | |
| 5,723,601 A * | 3/1998 | Larsson | 536/103 |
| 5,738,790 A | 4/1998 | Hagen et al. | |
| 5,814,567 A | 9/1998 | Yahiaoui et al. | |
| 5,824,335 A | 10/1998 | Dorigatti et al. | |
| 5,895,575 A | 4/1999 | Kraus et al. | |
| 5,897,779 A | 4/1999 | Wisted et al. | |
| 5,945,175 A | 8/1999 | Yahiaoui et al. | |
| 6,562,573 B2 | 5/2003 | Halaka | |
| 6,590,096 B1 * | 7/2003 | Berg et al. | 536/55.1 |
| 7,048,858 B2 * | 5/2006 | Ihre | 210/656 |
| 7,214,371 B1 * | 5/2007 | Cohen et al. | 424/93.7 |
| 7,479,222 B2 * | 1/2009 | DiLeo et al. | 210/198.2 |

(Continued)

FOREIGN PATENT DOCUMENTS

| EP | 0197784 A1 | 10/1986 |
|---|---|---|
| EP | 0328256 A1 | 8/1989 |
| EP | 0474617 A1 | 3/1992 |
| EP | 1468723 A1 | 10/2004 |
| EP | 1470854 A1 | 10/2004 |

(Continued)

OTHER PUBLICATIONS

Chaplin, M, "Water Structure and Science," Chapter describing the "Hofmeister Series," Updated Aug. 8, 2007; obtained online at <http://www.lsbu.ac.us/water/index2.html> and <http://www.lsbu.ac.us/water/hofmeist.html>.*

(Continued)

*Primary Examiner* — Lawrence E Crane
(74) *Attorney, Agent, or Firm* — EMD Millipore Corporation

(57) ABSTRACT

A method for making functionalized porous crosslinked polysaccharide gel coated structures used as liquid chromatography media is provided. The method includes impregnating a porous substrate with a room temperature stable aqueous polysaccharide solution containing water, 0.1% to 20% of a polysaccharide, 18% to 54% of a gel-inhibiting agent to prevent the gel from re-gelling, and 0.001% to 10% of an anionic fluorosurfactant for optimum solution coatability onto the substrate, each concentration is by total weight of the aqueous solution. Next water is evaporated from the coating, followed by exposing the dehydrated coating to a gelling agent thereby forming a porous polysaccharide gel coated substrate. Next the gel coated substrate is exposed to a crosslinking agent forming a porous crosslinked polysaccharide gel coated substrate. Next, the gel coated substrate is functionalized by contacting the porous polysaccharide gel coated substrate with sodium 3-bromopropanesulfonate, thereby attaching sulfopropyl ligands to the gel coated substrate, resulting in a functionalized porous absorptive polysaccharide gel coated chromatography structure. When the functionalized gel coated chromatography structure is used as liquid chromatography media, and a protein (e.g. lysozyme) containing solution contacts the media, the sulfopropyl ligands attached to the gel coated chromatography structure will bond to the protein, thereby removing the protein from the protein containg solution.

8 Claims, No Drawings

(56) References Cited

U.S. PATENT DOCUMENTS

| | | | |
|---|---|---|---|
| 7,479,223 B2 * | 1/2009 | DiLeo et al. | 210/198.2 |
| 7,687,619 B2 * | 3/2010 | Moya et al. | 536/46 |
| 7,807,823 B2 * | 10/2010 | Moya et al. | 536/51 |
| 7,959,979 B2 * | 6/2011 | Moya | 427/385.5 |
| 8,008,476 B2 * | 8/2011 | Moya et al. | 536/51 |
| 8,158,196 B2 * | 4/2012 | Moya | 427/243 |
| 2003/0155676 A1 | 8/2003 | Lubda et al. | |

FOREIGN PATENT DOCUMENTS

| | | |
|---|---|---|
| WO | WO97/44070 A1 * | 11/1997 |
| WO | 00/50160 A1 | 8/2000 |
| WO | WO00/44928 A2 * | 8/2000 |
| WO | 03/008078 A2 | 1/2003 |
| WO | WO03/04627 A1 * | 6/2003 |
| WO | WO03/046027 A1 * | 6/2003 |

OTHER PUBLICATIONS

Cacace et al., "The Hofmeister Series: Salt and Solvent Effects on Interfacial Phenomenon," Quarterly Reviews in Biophysics, 30(3), 241-277 (Aug. 1997); only abstract supplied.*

International Search Report received for PCT Patent Application No. PCT/US2005/003296, mailed on May 17, 2005, 4 pages.

International Search Report received for PCT Patent Application No. PCT/US2005/003199, mailed on May 17, 2005, 2 pages.

Written Opinion received for PCT Patent Application No. PCT/US2005/003296, mailed on May 17, 2006, 6 pages.

International Search Report received for PCT Patent Application No. PCT/US2005/003333, mailed on May 19, 2005, 3 pages.

International Search Report received for PCT Patent Application No. PCT/US2005/003295, mailed on May 23, 2006, 4 pages.

International Search Report received for PCT Patent Application No. PCT/US2005/003281, mailed on May 23, 2005, 3 pages.

International Preliminary Report on Patentability received for PCT Patent Application No. PCT/US2005/003296, issued on Aug. 7, 2006, 7 pages.

Eveleigh et al., "Immunochemical Characteristics and Preparative Application of Agarose-Based Immunosorbents", Journal of Solid-Phase Biochemistry, vol. 2, No. 1, 1997, pp. 45-78.

Hamaker et al., "Rolled Stationary Phases: Dimensionally Strucured Textile Adsorbents for Rapid Liquid Chromatography of Proteins", Industrial & Engineering Chemistry Research, vol. 38, 1999, pp. 865-872.

Shibusawa, Yoichi, "Surface Affinity Chromatography of Human Peripheral Blood Cells", Journal of Chromatography B: Biomedical Sciences and Applications, vol. 722, No. 1-2, Feb. 5, 1999, pp. 71-88.

Striegel et al., "Molecular Characterization of Polysaccharides Dissolved in Me2NaC-LiCl by Gel-Permeation Chromatography", Carbohydrate Research, vol. 267, No. 2, Feb. 17, 1995, pp. 271-290.

Svec, F., "Organic Polymer Support Materials", Chromatoghraphic Science Series, vol. 87, 2nd Ed., 2002, pp. 17-48.

Valle et al., "Use of Ceramic Monoliths as Stationary Phase in Affinity Chromatography", Biotechnology Progress, vol. 19, Issue 3, 2003, pp. 921-927.

* cited by examiner

ROOM TEMPERATURE STABLE AGAROSE SOLUTIONS

CROSS REFERENCE TO RELATED APPLICATIONS

This application is a Divisional patent application of U.S. patent application Ser. No. 11/050,253, filed Feb. 3, 2005, U.S. Pat. No. 7,687,619, Issue Date of Mar. 30, 2010, which claims the benefit of U.S. Provisional Application No. 60/542,026, filed on Feb. 5, 2004, the entire content of each of which is incorporated herein in its entirety.

BACKGROUND OF THE INVENTION

Polysaccharides such as agaroses, dextrans and cyclodextrans are widely used materials in the life science and biology fields. They can be used as substrates for electrophoresis or as a capture or chromatography media, either directly as a size exclusion material or through the bonding of various capture ligands, such as Protein A to their surfaces or pores.

These products have for the most part been formed by a thermal phase separation process that separates the polymer from an aqueous phase. This is done because these polymers have a melting point and a gel point.

According to the prior art, to make an aqueous solution of agarose, the polymer must be heated above its melting temperature, which is about 92° C., in the presence of water. At or above that temperature the polymer melts and the molten polymer is then solvated by the water. The polymer remains soluble in water as long as the temperature is above the polymer's gel point, which is about 43° C. At and below the gel point, the polymer phase separates and becomes a hydrogel that takes on whatever shape the solution was in just before gelling.

An example of this process is the method for making agarose gel beads as illustrated in U.S. Pat. No. 5,723,601. In this process, an agarose solution is prepared by heating a mixture of agarose and water above the melting point of the polymer; the solution is then maintained at a temperature between the gel point and the melting temperature so that it can be processed. The hot agarose solution is then poured into a hot water-immiscible non-solvent for agarose (oil) and an emulsion is then prepared to form small droplets of aqueous agarose solution suspended in oil. Once the droplets have been formed, the entire system is cooled below the gel point of agarose to gel the droplets and thus form the gel beads.

The two main problems with the polysaccharide solutions of the prior are: (1) the need to maintain them at elevated temperatures without losing water thereby altering the composition of the solution and (2) the gelling behavior of the solution at lower temperatures thereby creating a gel of a fixed shape. This limits the range of applicability of these polymers to formats other than beads or slabs, such as coatings on porous materials due to the inability to process the polymer at room temperature to create layers (coatings) without substantially blocking the pores of said porous materials.

An alternative is known from WO 00/44928 in which agarose is dissolved in water with the use of one or more chaotropes such as urea, guanidium salts or potassium iodide. The solution of agarose formed in this way does not gel at room temperature. However, the coated porous structure that is made is not substantially porous. This may be due to the method of re-gelling the agarose or other factors not stated in the text.

SUMMARY OF THE INVENTION

The present invention relates to a room temperature polysaccharide solution. More particularly, it relates to a room temperature agarose solution The present invention is based on the finding that the gel point of aqueous agarose solutions that normally gel at a temperature above that of room temperature (20-23° C.) and preferably above 30° C. can be suppressed to near or below room temperature thereby creating stable solutions in which the polymer remains in solution under normal room temperatures. It has been found that by incorporating certain gel-inhibiting agents into an aqueous polysaccharide solution, the gel point is reduced or eliminated and the solution remains liquid at room temperature indefinitely. Gel-inhibiting agents that have been found to work include salts, such as lithium chloride and zinc chloride, and bases, such as sodium hydroxide and lithium hydroxide. Mixtures of said salts and said bases can also be used with the same desired results. The composition of the agarose solutions of the present idea can be further modified to include other additives, such as organic co-solvents or non-solvents, pH modifiers, surfactants or other polymers to customize the properties of the solution to improve the processability for the desired application.

DETAILED DESCRIPTION

A room temperature stable, non-gelling polysaccharide solution according to the present invention is comprised in one embodiment of a polysaccharide such as agarose, a solvent for the agarose, such as water and one or more gel-inhibiting agents. Another embodiment comprises a polysaccharide such as agarose, a solvent for the polysaccharide, such as water, one or more gel-inhibiting agents and one or more wetting agents.

The polysaccharide of the present solution is an agarose or other polysaccharide that does not dissolve at room temperature in water but will dissolve at higher temperatures and then gel as the temperature falls toward room temperature. Generally, the gel point is above 30° C. This includes most agaroses as well as some dextrans, substituted or cyclodextrans and the like. Other polysaccharides such as most dextrans or low gel point agaroses that easily dissolve in water at room temperature or celluloses that do not dissolve at all in water would not need to use the solution of the present invention.

The room temperature stable solution is formed of polysaccharide preferably a dextran or agarose, one or more gel-inhibiting agents such as various salts or bases, and one or more solvents such as water for the polysaccharide.

To form the solution of the present invention, the polysaccharide, one or more gel-inhibiting agents and solvent are mixed and heated above the melting point of the polysaccharide. The melting point varies for different grades of polysaccharide, but typically for agarose it is between about 90° C. and 98° C., most commonly between 92° C. and about 98° C. This may be done in one step by combining and heating all three components together.

Alternatively and preferably, one can first add the polysaccharide in powdered form to a solvent such as water and disperse the powder into a slurry. It is then heated to dissolve the polysaccharide and cooled it to form a gel. The gel-inhibiting agent is added and dissolved into the gel and form a room temperature stable solution. Optionally, the gel can be reheated to speed the solution of the gel-inhibiting agent is added and dissolved into the solution. Once it has completely dissolved, the solution is cooled, typically to about room temperature (20-23° C.).

In either method, the polysaccharide is dissolved by heating the dispersion in a range of from approximately 90° C. to the boiling temperature. This can be done, for example, in a stirred vessel, or in a microwave oven. The hot solution may be filtered if needed to remove undissolved gel or other particles. Once a clear solution is formed, the solution preferably is allowed to cool, One may allow this cooling to occur naturally or one may, if desired, affirmatively cool the solution. At room temperature, the solution is a stable, non-gelled solution. The gel point (typically between 30° C. and 68° C.) is suppressed by the addition of the one or more gel-inhibiting agents.

The type of polysaccharide used will be determined by the properties desired of the final coating. The dispersion is made so that the final concentration of polysaccharide is between about 0.1% to about 20%, preferable between about 1% to about 10%, more preferably between about 2% to about 6%, by weight of total final solution.

While water is the preferred solvent for the polysaccharide, a minor amount, up to 20% by weight of the dissolving solution, of co-solvent may be added to improve solubility of the polysaccharide. Examples of suitable co-solvents are dimethylacetamide or dimethylsulfoxide. Others are known to those skilled in the art.

A gel-inhibiting agent is used to prevent the gel from re-gelling after melting and cooling. The agent may be added to the hot solution, or to the solution after cooling to a temperature above the gel point, or at any time prior to complete gelation. In a preferred method, a gel-inhibiting agent is simply added and stirred into the gelled solution. When added to the gel, the heat generated by the addition of the agent tends to assist dissolution of the agent and the formation of a room temperature stable solution. Preferred agents are based on zinc, lithium or sodium salts such as $ZnCl_2$, LiCl, and NaOH. Zinc salts can be used at a concentration of greater than about 15% by weight, based on the dissolving solution, up to the solubility limit, about 45.8% for $ZnCl_2$, and about 54.6% for $Zn(NO_3)_2$. Lithium salts can be used at concentrations greater than about 18%, to their solubility limit, about 45.8% for LiCl, 51.0% for LiNO3, or 54.0% for LiSCN. NaOH can also be used at about IM concentration. A preferred salt is $ZnCl_2$.

The present solution may be used to form gel films such as those used in 2D and 3D electrophoresis, or beads, such as agarose or dextran beads used in chromatography, or as a coating on a porous support to form a porous absorptive structure.

When used as a coating, it is preferable to add gel-modifying materials to the solution in order to modify and control the structure and properties of the final coating. Likewise in forming certain films or beads the addition of various gel-modifying materials may also be beneficial.

One class of added gel-modifying materials comprises volatile organics, miscible with the solution. Examples are monohydric alcohols such as methanol, ethanol, and propanols. These can be used up to concentrations that give a slightly cloudy solution. Higher amounts of these alcohols can cause precipitation of the agarose. Preferred amounts are equi-volumetric with the water in the solution, more preferred is to add the alcohols to about 40% to about 60% of the water. A preferred alcohol is methanol. Miscible ketones such as acetone can also be used, but care must be used as the solubility of agarose is less in ketone-water mixtures. Any mixture of two or more of these materials is also contemplated.

Another class of added gel-modifying materials comprises non-volatile miscible organics. Non-limiting examples of these included glycerine, ethylene glycol, methyl pentane diol, diethylene glycol, propylene glycol, triethylene glycol, the methyl, ethyl, or n-butyl ethers of ethylene glycol, the dimethyl or diethyl ethers of ethylene glycol, ethylene glycol dimethyl ether acetate ethylene glycol diethyl ether acetate, diethylene glycol methyl ether, diethylene glycol ethyl ether, diethylene glycol n-butyl ether, diethylene glycol dimethyl ether, diethylene glycol diethyl ether, diethylene glycol dimethyl ether acetate, diethylene glycol diethyl ether acetate, N-methyl morpholine, N-ethyl morpholine, and the like. Polyethylene glycols of low molecular weight are also examples of materials that are in this class. Any mixture of two or more of these materials is also contemplated. Another class of added gel-modifying materials comprises water-soluble polymers, which include by way of examples, polyvinyl pyrrolidone, polyvinyl alcohol, polyethylene glycols, dextrans, and water-soluble polyacylamides, including substituted polyacrylamides, such as polydimethylacrylamide. These polymers are believed to act as "porogens." That is, they control the amount of volume of the coating that is freely permeable to dissolved solutes when the coated porous substrate is in use.

These polymeric additives can be used as blends with the polysaccharide in the initial dissolution step, or they can be dissolved in the solution with or after the added materials just discussed are mixed. Care must be taken not to add an excessive amount of polymer, as coagulation of the solution may occur. Ratios of polymer to polysaccharide of from about 0.1 to 10 are possible. Preferred polymers are polyvinyl alcohol and dextrans. Polyacrylamides have also been found to be useful.

To obtain optimum coatability of the solution on to a substrate, one or more surfactants are added to the solution. Each combination of solution type and substrate will require some experimentation to determine the optimum type of surfactant. Anionic surfactants have been found to be useful, with anionic fluorosurfactants being preferred. Of these, 3M FC-99 and FC-95 or equivalents from other suppliers are most preferred. These can be used in concentrations of from about 0.001% to about 10%, preferably from about 0.01% to about 5% by total weight of the solution.

When formed as a coating, the substrate is impregnated with the coating such as soaking the substrate in a bath of the coating, applying the coating material by a doctor blade, spray nozzle, curtain coater, roll coater, extrusion coater or any other method known to one of ordinary skill in the art to apply a coating to a porous substrate. Excess coating material is removed such as by blotting or shaking the coated substrate, squeezing such as through a nip roller, scraping the surface of the coated matrix or by blowing air or a gas at the substrate's surface.

The solvent for the solution (be it in a film, bead or coating form) is then preferably at least partially removed by evaporation. Preferably, this is a controlled evaporation such that the coating evaporates relatively uniformly throughout the entire substrate. The use of heat warmed air (preferably between 20 and 80° C.), microwave drying, vacuum oven drying and the like to control and/or sped evaporation may be used if desired. This causes a polysaccharide hydrogel to be formed that is dry to the touch, but still contains some residual moisture within it. The structure formed by the solution of the present invention can be gelled by subjecting the solution in whatever form to a gelling agent that removes the salts from the coating and causes the polysaccharide to form a porous hydrogel structure. The agent can be water, if done so as not to overly swell the coating. This can be done by controlling the previous solvent removal/drying step (if used) so that the water extracts the gel-inhibiting agents before deleterious swelling can occur. Once a large proportion of the gel-inhibiting agents are removed, swelling in water is reduced to a minimum. The use of water with added salts reduces the tendency of the aqueous rinse to swell the coating.

The use of organic solvents as the gelling agents to remove the gel-inhibiting agents without swelling the gel is preferred. Acetone, methanol, ethanol, or propanols are useful. Mixtures of from about 25% to about 95% acetone or methanol in water have been found to be useful. Similar acetone/methanol mixtures are also useful.

The solution in whatever form (film, bead or coating) may be sprayed with the gelling agent, although preferably it is immersed into a bath containing the agent. The agent is preferably applied at room temperature.

It is then rinsed with water and maintained preferably in a wet state. This rinsing step is generally done at temperatures between about 15° C. and about 50° C., preferably between 20° C. and 50° C. In the embodiment of a coated substrate, the underlying substrate will have at least a portion of all of its surfaces (facial and interior surfaces) covered with a coating that is permeable to biomolecules. Preferably the coating is relatively uniformly applied to the matrix. More preferably, substantially all of the surfaces are covered by the coating. Also preferably, the coating is of relatively uniform thickness throughout the substrate.

To form a gel film, one simply selects a flat surface such as metal tray or glass plate and spreads the solution over that surface. A gelling agent that is a non-solvent or poor solvent for the polysaccharide and a solvent for the gel-inhibiting agent is then applied to the surface. This can be accomplished by simply sinking the tray or plate into a bath of the gelling agent or by applying a stream of the gelling agent to one or more surfaces of the solution. The gelling agent removes the solvent for the polysaccharide such as water and the gel-inhibiting agent(s) from the solution causing the polysaccharide to gel and form a self-supporting stable structure.

To form a bead, one may simply applies the solution drop wise to a bath of a gelling agent that is a non-solvent for the polysaccharide and a solvent for the gel-inhibiting agent. The gelling agent removes water and the gel-inhibiting agent(s) from the solution causing the polysaccharide to gel as a bead and form a self-supporting stable structure. Alternatively, one can use one or more nozzles that apply the drops to the bath or one may an atomizer to form spray droplets that then contact the bath. In another embodiment, one can use one or more screens spaced apart from each other and located above the bath through which the solution can be fed to form droplets of the desired size. Likewise, one can simply swirl the solution into a bath of gelling agent with sufficient turbulence or with sufficient immiscibility of the polysaccharide that a distinct two-phase fluid is formed with the solution of polysaccharide being the discontinuous phase.

In forming a coating for a porous substrate, a porous matrix needs to be chosen. The matrix may be a fiber, a sheet such as a woven fabric, a non-woven, a mat, a felt or a membrane or it may be a three dimensional structure such as a sponge, poly(HIPES) or other monolithic structure such as a honeycomb, or a porous bead such as a controlled pore glass, porous styrene beads, silica, zirconia and the like. Preferably, the matrix is sheet formed of a woven or non-woven fabric or a membrane.

The solution is applied as described above to the matrix so that at least a portion of all its surfaces (both facial surfaces as well as the interior surfaces of the pores) are covered by the solution. Preferably, it then dried before being subjected to the gelling agent that causes the coating to form on the matrix surfaces.

The coating may then be crosslinked if desired by any of the chemistries commonly used in the industry to crosslink materials containing multiple hydroxyl groups, such as polysaccharide beads, these chemistries being as non-limiting examples, epichlorohydrin or other multifunctional epoxy compounds, various bromyl chemistries or other multifunctional halides; formaldehyde, gluteraldehyde and other multifunctional aldehydes, bis(2-hydroxy ethyl)sulfone, dimethyldichioro-silane, dimethylolurea, dimethylol ethylene urea, diisocyanates or polyisocyanates and the like. For dextran coatings, the use of a crosslinking step is required. Typically this occurs after drying of the coating to the substrate, although some partial crosslinking of the solution before coating maybe done is desired.

It may also have one or more functionalities applied to it, including ligands, such as Protein A or Protein G, natural or recombinatorily derived versions of either, modified versions of protein A or G to render them more caustic stable and the like, various chemical ligands such as 2-aminobenzimidazole (ABI), aminomethylbenzimidazole (AMBI), mercaptoethylpyridine (MEP) or mercaptobenzimidazole (MBI), or various chemistries that render the coating cationic, anionic, philic, phobic or charged, as is well-known in the art of media formation.

Functional groups used in liquid chromatography that are adaptable to the present invention include groups such as, but not limited to, ion exchange, bioaffinity, hydrophobic, groups useful for covalent chromatography, thiophilic interaction groups, chelate or chelating, groups having so called pi-pi interactions with target compounds, hydrogen bonding, hydrophilic, etc.

The following are examples of the solutions of the present invention, their manufacture and their uses.

Example 1

Room Temperature Stable Agarose Solution 4 grams of agarose powder (type XII, obtained from Sigma-Aldrich) were added to 76 grams of water, the mixture was agitated while heating at a temperature of 95° C. until an initial agarose solution was formed. This initial free flowing solution was cooled to room temperature, at which point the solution became a gel having no free flowing characteristics at all. To this gel, 20 grams of lithium chloride were added and the mixture was heated again to 95° C. while agitating until the gel and the salt dissolved to form a homogeneous solution. This solution was then cooled to room temperature, the solution's free flowing characteristics were retained at this temperature.

Example 2

Room Temperature Stable Agarose Solution Having Other Additives 6 grams of agarose powder (type XII, obtained from Sigma-Aldrich) were added to 40 grams of water, the mixture was agitated while heating at a temperature of 95° C. until an initial agarose solution was formed. This initial free flowing solution was cooled to room temperature, at which point the solution became a gel having no free flowing characteristics at all. To this gel, 15 grams of zinc chloride were added and the mixture was heated again to 95° C. while agitating until the gel and the salt dissolved to form a homogeneous solution. This solution was then cooled to room temperature, the solution's free flowing characteristics were retained at this temperature. To this solution, 39.9 grams of methanol and 0.1 grams of Fluorad FC-95 fluorosurfactant (3M Company) were added while mixing to form the final agarose solution. This final solution remained liquid at room temperature.

Example 3

Coating Using Room Temperature Stable Agarose

A polyolefin non-woven fabric (Type F02463 from Freudenberg Nonwovens NA of Lowell, Mass.) having a pore size of about 100 microns and a porosity of about 85% was coated with agarose of Example 2 according to the following procedure. The fabric was exposed to the agarose solution of Example 2 such that the fabric was completely wetted by the solution. The wet fabric was then placed between two sheets of polyethylene film and squeezed gently to remove excess solution from the surface of the fabric, the fabric was then removed from the film sheets and allowed to dry at room temperature to remove the methanol and unbound water by evaporation. The dry coated fabric was then immersed in an acetone gelling agent to gel the agarose and to remove the salt and surfactant thus creating the coating of essentially pure agarose. The coated fabric was immersed in water to further rinse the fabric and to remove the acetone, the agarose coated fabric was then kept in water.

Example 4

Crosslinking of Agarose Coating

The water-wet agarose coated fabric from example 3 was immersed in a mixture containing 5 grams of epichlorohydrin and 95 grams of 2M sodium hydroxide, the temperature of this mixture was then raised to 50° C. and the crosslinking reaction was allowed to proceed at this temperature for 16 hours under gentle agitation. The crosslinked coated fabric was rinsed with water several times to remove excess reactants and base.

Example 5

Functionalization of Crosslinked Agarose Coating with Sulfopropyl (SP) Groups

The crosslinked agarose coated fabric of example 4 was immersed in a solution containing 6 grams of sodium bromopropanesulfonate 94 grams of 1M sodium hydroxide, the temperature of this solution was then raised to 50° C. and the functionalization reaction was allowed to proceed at this temperature for 16 hours under gentle agitation. The sulfopropyl functionalized coated fabric was rinsed with water several times to remove excess reactants and base, the fabric was kept in water.

Example 6

Protein Binding of SP Functionalized Agarose Coated Fabric

A 13 mm disk of the SP functionalized agarose coated fabric from example 5 was immersed in 6 ml of phosphate buffer at pH7, conductivity of 2 mS and containing lysozyme in a concentration of 1 g/L, the fabric was allowed to remain in contact with the protein solution for 16 hours at room temperature under agitation. After 16 hours, the concentration of lysozyme in the protein solution was measured and the amount of protein bound to the fabric was calculated based on the volume of the 13 mm disk of fabric. The protein binding capacity of the fabric was measured to be 50 mg lysozyme/ml fabric. The water flow rate through the media was determined by measuring the flow rate through a circular sample of the modified fabric having a diameter of 13 mm and using a column of water 15 cm in height. The sample had a flow rate of water of 50 ml in 14 seconds under these conditions. The uncoated substrate had a flow rate of 50 ml in 6 seconds under the same conditions.

Example 7

Making Agarose Beads using Room Temperature Stable Agarose Solution

The agarose solution of Example 1 was placed in a Badger airbrush (Franklin Park, Ill.) model 250 and the solution was sprayed over an acetone bath under constant stirring. The droplets of agarose solution gelled immediately upon contacting the acetone thereby forming small gel beads, which quickly sank to the bottom of the acetone bath. The beads were then recovered by filtration and were subsequently washed with water several times to remove the acetone. The agarose beads (about 5 microns in diameter) were kept in water.

The invention claimed is:
1. A method for making a porous functionalized crosslinked polysaccharide hydrogel coated structure comprising:
   a) impregnating a porous substrate selected from the group consisting of fibers, woven fabrics, nonwoven fabrics, membranes, mats, monolithic honeycomb structures, felt sheets, poly(HIPES) monolithic structures, three dimensional structures, sponges, and porous beads, with a room temperature stable aqueous polysaccharide solution forming a room temperature stable aqueous polysaccharide coating on the substrate, the aqueous solution containing, i) water, ii) a polysaccharide having a concentration in the aqueous solution from about 0.1% to about 20%, and selected from the group consisting of agarose, dextrans, cyclodextrins and blends thereof, iii) a gel-inhibiting agent having a concentration in the aqueous solution from about 18 to about 54%, and selected from the group consisting of $ZnCl_2$, LiCl, NaOH, $LiNO_3$, LiOH, LiSCN and mixtures thereof, and iv) an anionic fluorosurfactant having a concentration in the aqueous solution from about 0.001% to about 10% by total weight of the aqueous solution;
   b) evaporating the water from the polysaccharide coating;
   c) exposing the dehydrated polysaccharide coating to a gelling agent selected from the group consisting of acetone and acetone in water to form a porous polysaccharide hydrogel coated substrate:
   d) exposing the hydrogel coated substrate to a crosslinking agent selected from the group consisting of epichlorohydrin, multifunctional epoxy compounds, multifunctional halide compounds, formaldehyde, gluteraldehyde, multifunctional aldehyde compounds, bis(2-hydroxy ethyl)sulfone, dimethyldichlorosilane, dimethylolurea, dimethylol ethylene urea, diisocyanate compounds, and polyisocyanate compounds to form a porous crosslinked polysaccharide hydrogel coated substrate; and
   e) contacting the crosslinked polysaccharide hydrogel coated substrate with sodium 3-bromopropanesulfonate, and attaching sulfopropyl functional groups by a functionalization reaction to the crosslinked polysaccharide hydrogel coated substrate.

2. The method according to claim 1, wherein the porous substrate is a polyolefin non-woven fabric.

3. The method according to claim 1, wherein the polysaccharide is agarose.

4. The method according to claim 1, further comprising a step of rinsing the crosslinked polysaccharide hydrogel coated substrate with water between steps (d) and (e).

5. The method for making a functionalized liquid chromatography media comprising:
   a) impregnating a porous substrate selected from the group consisting of fibers, woven fabrics, non-woven fabrics, membranes, mats, monolithic honeycomb structures, felt sheets, poly(HIPES) monolithic structures, three dimensional structures, sponges, and porous beads, with a room temperature stable aqueous agarose solution, the aqueous agarose solution containing, i) water, ii) agarose having a concentration in the aqueous solution from about 0.1% to about 20%, iii) a gel-inhibiting agent having a concentration in the aqueous solution from about 18 to about 54%, and selected from the group consisting of $ZnCl_2$, NaOH, $LiNO_3$, LiOH, LiSCN and mixtures thereof, and iv) an anionic fluorosurfactant having a concentration in the aqueous solution from about 0.001% to about 10% by total weight of the aqueous solution;
   b) forming a room temperature stable aqueous agarose coating on the substrate;
   c) evaporating the water from the agarose coating;
   d) exposing the agarose coating to a gelling agent selected from the group consisting, of acetone and acetone in water to form a porous polysaccharide hydrogel coated substrate;
   e) exposing the hydrogel coated substrate to a crosslinking agent selected form the group consisting of epichlorohydrin, multifunctional epoxy compounds, multifunctional halide compounds, formaldehyde, gluteraldehyde, multifunctional aldehyde compounds, bis(2-hydroxy ethyl)sulfone, dimethyldichlorosilane, dimethylolurea, dimethylol ethylene urea, diisocyanate compounds, and polyisocyanate compounds to form a porous crosslinked agarose hydrogel coated substrate;
   f) rinsing the porous crosslinked agarose hydrogel coated substrate with water, and
   g) contacting the crosslinked agarose hydrogel coated substrate with odium 3-bromopropanesulfonate, and attaching sulfopropyl functional groups by a functionalization reaction to the porous crosslinked agarose hydrogel coated substrate forming, a functionalized liquid chromatography media.

6. The method according to claim 5, wherein the porous substrate is a polyolefin non-woven fabric.

7. A functionalized liquid chromatography media comprising:
   a) a porous substrate selected from the group consisting of fibers, woven fabrics, non-woven fabrics, membranes, mats, monolithic honeycomb structures, felt sheets, poly(HIPES) monolithic structures, three dimensional structures, sponges, and porous beads;
   b) a porous crosslinked agarose hydrogel coating located on the porous substrate, the crosslinked agarose hydrogel coating formed from, a room temperature stable aqueous agarose solution applied to the substrate containing, i) water, ii) agarose having a concentration in the aqueous solution from about 0.1% to about 20%, iii) a gel-inhibiting agent having a concentration in the aqueous solution from about 18 to about 54%, and selected from the group consisting of $ZnCl_2$, LiCl, NaOH, $LiNO_3$, LiOH, LiSCN and mixtures thereof, and iv) an anionic fluorosurfactant having a concentration in the aqueous solution from about 0.001% to about 10% by total weight of the aqueous solution, wherein the water is evaporated from the coating and the coating is exposed to v) a gelling agent selected from the group consisting of acetone and acetone in water forming a porous agarose hydrogel coated substrate, wherein the porous agarose hydrogel coated substrate is exposed to vi) a crosslinking agent selected form the group consisting of epichlorohydrin, multifunctional epoxy compounds, multifunctional halide compounds, formaldehyde, gluteraldhyde, multifunctional aldehyde compounds, bis (2-hydroxy ethyl)sulfone, dimethyldichlorosilane, dimethylolurea, dimethylol ethylene urea, diisocyanate compounds, and polyisocyanate compounds forming a porous crosslinked agarose hydrogel coated substrate: and
   c) contacting the crosslinked agarose hydrogel coated substrate with sodium 3-bromopropanesulfonate, and attaching sulfopropyl functional groups by a functionalization reaction to the porous crosslinked agarose hydrogel coated substrate.

8. The chromatography media according to claim 7, wherein the porous substrate is a polyolefin non-woven fabric.

* * * * *

UNITED STATES PATENT AND TRADEMARK OFFICE
CERTIFICATE OF CORRECTION

PATENT NO. : 8,552,177 B2  Page 1 of 1
APPLICATION NO. : 13/221439
DATED : October 8, 2013
INVENTOR(S) : Wilson Moya et al.

It is certified that error appears in the above-identified patent and that said Letters Patent is hereby corrected as shown below:

In the Claims

In column 9, Line 36, in Claim 5 delete "form" and insert -- from -- therefor.

In column 9, Line 47, in Claim 5 delete "odium" and insert -- sodium -- therefor.

In column 10, Lines 1-2, in Claim 5 delete "hydrogel hydrogel" and insert -- hydrogel -- therefor.

In column 10, Line 2, in Claim 5 delete "substrate forming," and insert -- substrate, forming -- therefor.

In column 10, Lines 33-34, in Claim 7 delete "gluteraldhyde" and insert -- gluteraldehyde -- therefor.

Signed and Sealed this
Fourth Day of March, 2014

Michelle K. Lee
*Deputy Director of the United States Patent and Trademark Office*